W. J. Stevenson,
Soldering Machine.

Nº 11,876.      Patented Oct. 31, 1854.

UNITED STATES PATENT OFFICE.

WILLIAM J. STEVENSON, OF NEW YORK, N. Y.

IMPROVED SOLDERING-FURNACE.

Specification forming part of Letters Patent No. 11,876, dated October 31, 1854.

*To all whom it may concern:*

Be it known that I, WILLIAM J. STEVENSON, of the city, county, and State of New York, have invented a new and useful Improvement in Soldering-Furnaces; and I do hereby declare that the following is a full, clear, and exact description of the same, reference being had to the accompanying drawings, forming part of this specification, in which—

Figure 1:
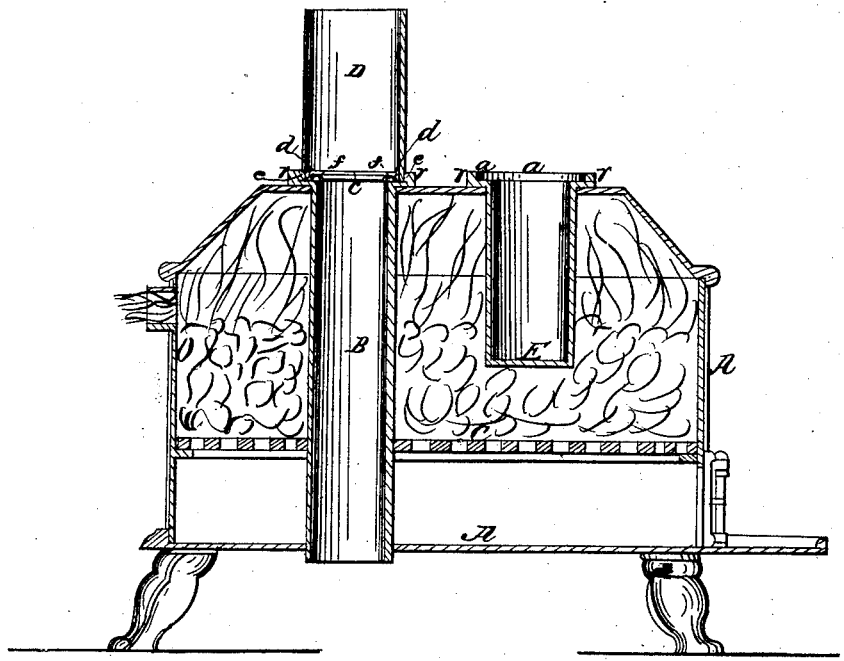
Figure 2:
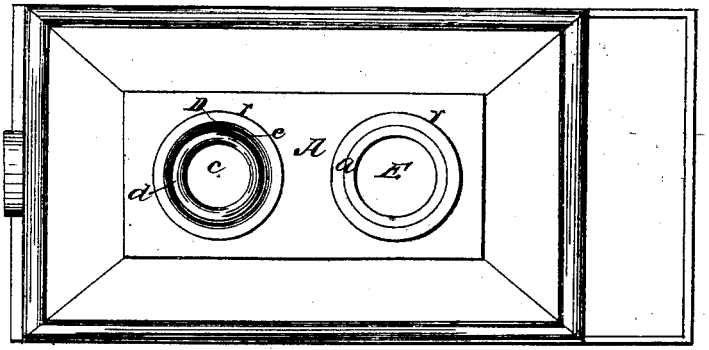

Figure 1 is a vertical longitudinal section of a furnace with my improvements, a tin preserve-can being shown as undergoing the operation of soldering on its bottom. Fig. 2 is a plan or top view of the same.

Similar letters of reference in each of the two figures indicate corresponding parts.

My invention relates to a new and useful improvement in furnaces for soldering the tops and bottoms to the bodies of tin preserve-cans and other similar vessels, whereby the process is performed much more expeditiously and with less solder, and also in a much better and neater manner than when performed in the old way.

The nature of my invention consists in so constructing the furnace that the entire circumference of each of the joints of the can shall be soldered all at once, and during the performance of the same no other parts of the can besides the lap and that part of the bottom or top upon which the ring of solder lies shall be exposed to a melting-heat. In soldering by the old process the appearance and quality of the can is very greatly injured from the melting of the tin with which the sheet metal is coated, owing to the entire surface of the bottom and top and a large portion of the body being constantly exposed to a melting-heat. By my invention this is almost entirely prevented, as will be presently seen.

To enable others skilled in the art to make and use my invention, I will proceed to describe its construction and operation.

A is the furnace, made of oblong, square, or cylindrical shape, and having an open cylindrical or slightly conical air-tube, B, passing entirely through its center for keeping at a moderate heat the metal between the lap and the center of the bottom of the can, while the lap and the part upon which the ring of solder lies are kept at a melting-heat by the metal of the furnace, which is overlapped by the flange at the top of the tube. The exterior case, A, and the open air-tube B forms the fire-space, and has a grate, C, at the bottom, upon which the fire rests. The top of the furnace which covers the fire-space, but not the air-tube, is overlapped a short distance by the flange $r\ r$ on the upper end of the open air-tube B. This flange is provided with a recess, $a\ a$, all around the air-passage, which is about one-fourth of an inch greater in diameter than said passage, and serves to receive the head or bottom $c$ of the can D. It is also deep enough to receive the whole of the lap $e$, as shown in the drawings. By thus having the flange on the upper edge of the tube B overlap the top of the furnace it will, when the furnace is heated to the proper degree, be exposed directly to the heat, and the lap of the can and the part on which the solder $d$ lies heated sufficiently to melt the ring of solder and cause a perfectly tight joint to be formed, and by providing the air-passage B the part of the head which does not rest on top of the furnace, but stands over the air-passage, is kept at a moderate heat by the air which enters the tube B, and thus it will be seen the tinned surface is saved from being injured in quality or appearance during the soldering process.

The solder, when used for forming the joints or seams of preserve-cans, should be made in the form of a ring, and laid in a groove formed in the bottom and top of the can by raising a bead, $f$, as shown. By thus using and placing the solder the whole ring, by my invention, can be melted at once, and when melted confined and prevented from running away from where its presence is required until it insinuates itself into the joint or seam.

Instead of having the air-tube B pass entirely through the furnace, it may be made to extend only half-way through it and have one of its ends closed, as shown at E, and thus form an air-chamber. This arrangement would answer nearly as good a purpose as the air-tube B, it admitting of the greater portion of the bottom or top of the can being kept free from direct contact with the melting-heat.

To solder tin preserve-cans with facility and in a perfect manner with my furnace, it is best to construct their bottoms and tops with a groove and a lap, and to put the body and bottom together and drop a ring of solder in the groove. The partly-finished can is then put on the furnace, as shown, and let remain until the solder is melted and the joint formed. After the bottom joint is formed remove the can, put a ring of solder in the groove of the top, place the top on the can, and put the can on the furnace bottom upward, and let it remain until the solder melts and forms the top joint, when it should be removed and another can, put together as before, put on the furnace and subjected to a like operation.

What I claim as my invention, and desire to secure by Letters Patent, is—

Providing a soldering-furnace with an air-tube, B, and a recess, $a\ a$, or their equivalents, so that the entire circumference of each of the joints of the can shall be soldered all at once, and during the performance of the same no other parts of the can besides the lap and that portion of the bottom or top upon which the ring of solder lies are exposed to a melting heat, substantially as and for the purposes herein described.

WILLIAM J. STEVENSON.

Witnesses:
R. W. FENWICK,
I. W. COOMBS.